United States Patent [19]

Muchow et al.

[11] Patent Number: 4,611,630
[45] Date of Patent: Sep. 16, 1986

[54] SINGLE HYDRAULIC LINE CHOKE VALVE SYSTEM

[75] Inventors: John D. Muchow, Sugar Land; Kenneth L. Pelata, Pearland, both of Tex.

[73] Assignee: Hydril Company, Houston, Tex.

[21] Appl. No.: 678,657

[22] Filed: Dec. 6, 1984

[51] Int. Cl.[4] .................. F16K 3/24; F16K 31/163; F16K 31/528

[52] U.S. Cl. .................. 137/625.37; 251/59; 251/58; 74/126; 74/50; 137/219

[58] Field of Search ............... 251/59, 58, 138; 74/50, 74/126; 137/219, 625.37

[56] References Cited

U.S. PATENT DOCUMENTS

| | | | |
|---|---|---|---|
| 853,707 | 5/1907 | Margadant | 74/50 |
| 1,610,031 | 12/1926 | Backhouse | 74/50 X |
| 1,886,518 | 11/1932 | Beckwith | 251/59 X |
| 3,060,957 | 10/1962 | Richards | 137/625.33 X |
| 3,330,289 | 7/1967 | Grace | 251/59 X |
| 3,430,654 | 3/1969 | Mills | 137/625.28 |
| 4,132,386 | 1/1979 | Lee . | |
| 4,379,543 | 4/1983 | Reaves | 251/59 |
| 4,471,810 | 9/1984 | Muchow et al. . | |

FOREIGN PATENT DOCUMENTS 387991  1/1924  Fed. Rep. of Germany ........ 251/59

OTHER PUBLICATIONS

Bird-Johnson, Model Hyd-ro-ac Hydraulic Rotary Actuator Catalog, p. 2, Apr. 1984.

Primary Examiner—Arnold Rosenthal
Attorney, Agent, or Firm—Vaden, Eickenroht, Thompson & Boulware

[57] ABSTRACT

A choke valve with a power system operated via a single hydraulic line. The sleeve of the choke valve is operated by a carrier mounted through an eccentric pin and guide track arrangement to open and close the valve with the rotation of a valve drive shaft. A power shaft is driven by a clutch plate, ratchet connected to a drive clutch plate, in turn, operated by the shaft of an hydraulic actuator. The valve actuator creates an incremental step sensing of its full sixteenth turn movement by closing a fluid exhaust port and causing back pressure in the hydraulic line to occur. The actuator is reset by a pre-loaded torsion bar. Reset of the actuator also ratchet resets the drive clutch plate.

6 Claims, 6 Drawing Figures

*FIG. 3*
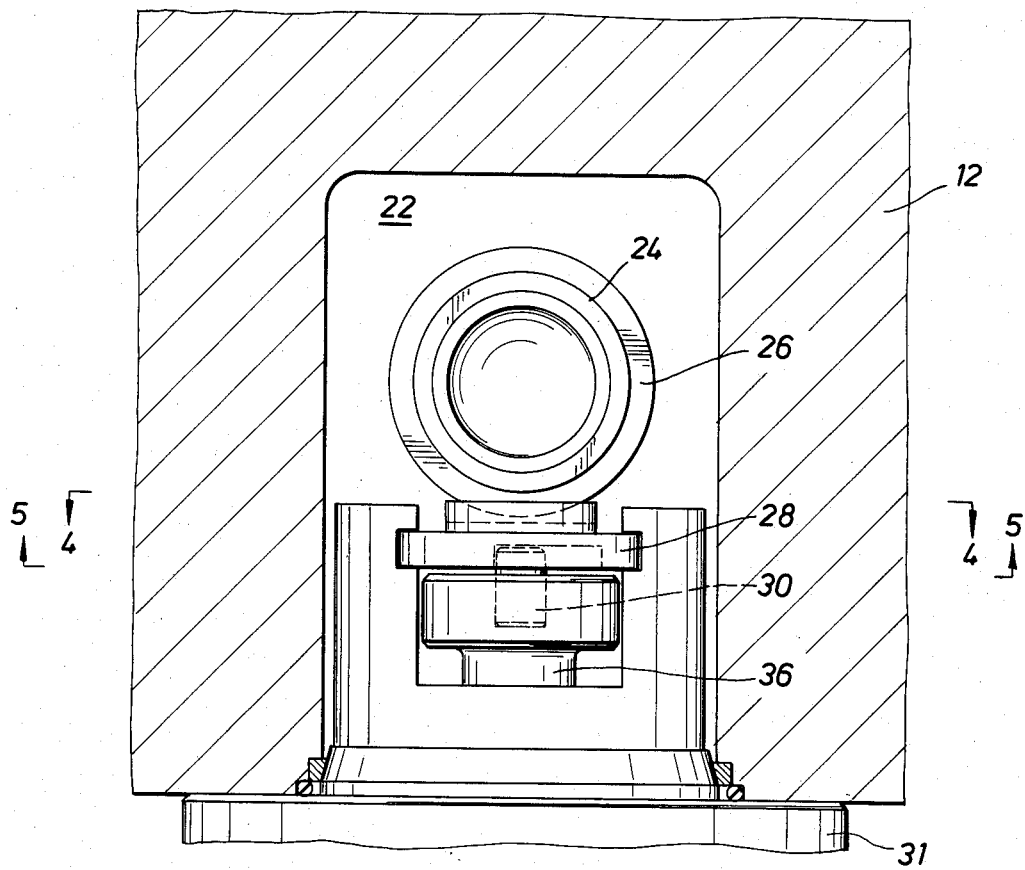
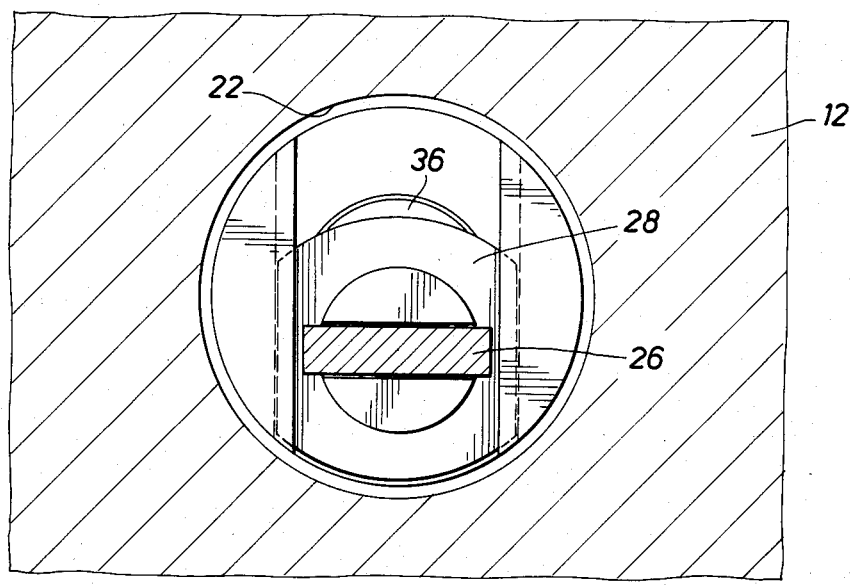
*FIG. 4*

1

SINGLE HYDRAULIC LINE CHOKE VALVE SYSTEM

BACKGROUND OF THE INVENTION

1. Field of the Invention

This invention relates to a system of controlling fluid flow, particularly in the presence of a large pressure drop, and more particularly in controlling the position of a choke with precision through the operation of a single hydraulic line input.

2. Description of the Prior Art

A choke valve has proven particularly wellsuited for determining the flow rate of fluids, even abrasive fluids, where the differential pressure drop across the valve is great, for example, on the order of 1000 pounds per square inch. Such a condition is encountered, for example, in the production of fluids of an offshore oil well where the valving of such fluids takes place typically at depths on the order of 2000 feet beneath the surface of the water.

U.S. Pat. No. 4,471,810 reveals a particularly worthy valving mechanism wherein the side ports around the inner cylinder of the choke valve are sized and positioned so that there is a linear change of flow rate with linear movement of the sleeve thereover, without causing great erosion in the flow path, as with the valve seat arrangement in U.S. Pat. No. 4,132,386.

The device shown in U.S. Pat. No. 4,471,810 is shown with a hand crank or other suitable valve closure mechanism where the parts are visible or otherwise readily manipulatible. For a subsea installation, however, the mechanisms shown for actuating the valve are unsuited.

It has heretofore been assumed that to obtain satisfactory control of the fluids encountered at subsea production environments it would be necessary to utilize mechanisms providing one or more of the following features: (1) use of proportional positioning of valve components by proportional hydraulic fluid application; (2) use of feedback in a servo-hydraulic system: (3) use of at least two hydraulic lines, one for operating the valve open and one for operating the valve closed; and (4) use of power for keeping the valve in a set position, even though the valve opening infrequently had to be modified.

Therefore, it is a feature of the present invention to provide an improved choke valve control operation utilizing only a single hydraulic line input.

It is another feature of the present invention to provide an improved choke valve control operation that does not consume power except when the valve opening is being changed.

It is still another feature of the present invention to provide an improved choke valve control operation that does not rely on the precision of the hydraulic control pressure to obtain precision of valve opening control.

SUMMARY OF THE INVENTION

A choke valve with an internal cylinder and an external sleeve is included in a common canister with a hydraulic control mechanism for positioning the sleeve with respect to the side flow ports in the cylinder to obtain the desired flow rate. The sleeve is keyed to a carrier via pin and projection components. The carrier is connected for eccentric movement with respect to the axis of a rotatable valve drive shaft using an off-axis pin from the drive shaft and a guide slot or track in the carrier. Hence, as the valve drive shaft rotates, the carrier moves back and forth and carries with it the sleeve of the choke.

The power for the valve drive shaft originates with a hydraulic vane actuator, which rotates a sixteenth of a turn (22.5°) when a hydraulic actuation pulse is received. The actuator is connected through a clutch comprising a first and second plate, ratchet-connected together during the actuation cycle. During the reset cycle, the first plate moves back while a brake maintains the position of the second plate and the power shaft driven thereby.

The power shaft drives the valve drive shaft through a gear reduction box so that each sixteenth turn of the power shaft translates into a one-degree rotation of the valve drive shaft. When drive is not taking place, a brake on the valve drive shaft maintains the position of this shaft and the parts connected thereto.

The size and position of the holes in the cylinder of the choke valve are preferably determined so that the flow rate is changed proportionally linearly with the angular rotation of the valve drive shaft, although this is not essential.

The reset mechanism of the vane operates by means of a torsion bar and related components. When the vane has operated to its full sixteenth turn, it closes the exhaust port, allowing the operator to sense completion of the acutation cycle. Upon release of actuating pressure from the chamber, the pretensioned torsion bar then resets the vane while the hydraulic fluid dumps and carries any residue from the vanes, thereby providing self-cleaning.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a typical embodiment of the invention and are not to be considered limiting of its scope as the invention may admit to other equally effective embodiments.

In the Drawings:

FIG. 3 is an end view of the choke valve shown in FIG. 1 taken at 3—3.

FIG. 4 is a top view of the valve shaft taken at 4—4 of FIG. 3.

DESCRIPTION OF THE PREFERRED EMBODIMENT

Figure 1:
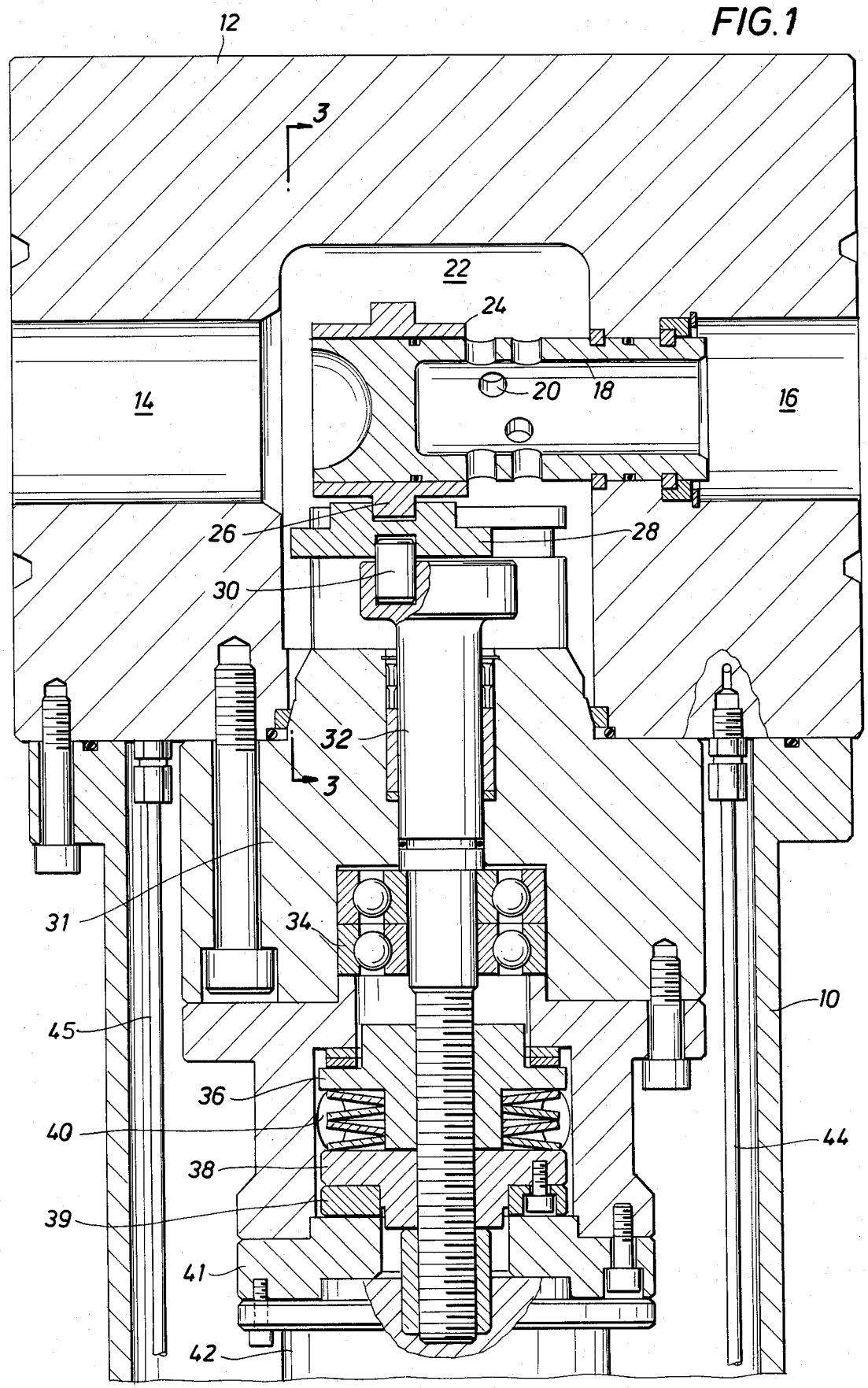
FIG. 1 is a cross-sectional view of the choke valve and valve drive shaft portion of a preferred embodiment of the present system.

Now referring to the drawings and first to FIGS. 1,3–5 the top part of a canister is shown comprising housing 10 bolted by conventional means to body 12, the body having an inlet opening 14 and an outlet opening 16 for fluid flow. Located between the inlet and outlet openings or channels just described is a choke valve comprising internal cylinder 18 having a plurality of entrance side flow ports 20 sized and positioned as hereinafter set forth. A portion of inlet channel 14 enlarges in central opening or channel 22 to provide access of the incoming fluid to the entrance flow ports just described.

External sleeve 24 is located for concentric movement about internal sleeve 18 so as to progressively close the total amount of opening provided by ports 20 as the sleeve moves from left to right in the drawing. Sleeve 24 includes a projection 26 for keying with an accommodating recess in carrier plate 28. That is, when carrier plate moves to the right in the drawing shown, sleeve 24 is carried therewith. In similar fashion, when carrier plate 28 moves to the left, again sleeve 24 is carried therewith.

Carrier plate 28 includes on its opposite side to the recess accommodating projection 26 an elongated guide slot for accommodating a pin or projection 30 extending from the end of valve drive shaft 32. Pin 30 is located off-center or off-axis with the axis of drive shaft 32. Hence, when shaft 32 rotates, pin 30, acting within the elongated slot or track in carrier plate 28, causes carrier plate 28 to move back and forth with the rotation. In conventional fashion, valve drive shaft 32 is mounted for rotation with respect to bearings 34.

Below bearing 34 within bonnet 31, shaft 32 reduces in diameter. A brake system comprising spring guide 36 and brake plate 38 are spline keyed to shaft 32. Brake pad 39 is bolted to plate 38 to provide a friction line between pad 39 and contiguous body member 41. The shaft is, hence, held in position by the friction provided by belleville springs 40 located between guide 36 and plate 38. When the shaft is not being powered so as to overcome the friction provided by the brake, the brake provides ample friction to hold the shaft in the assumed position.

Figure 2:
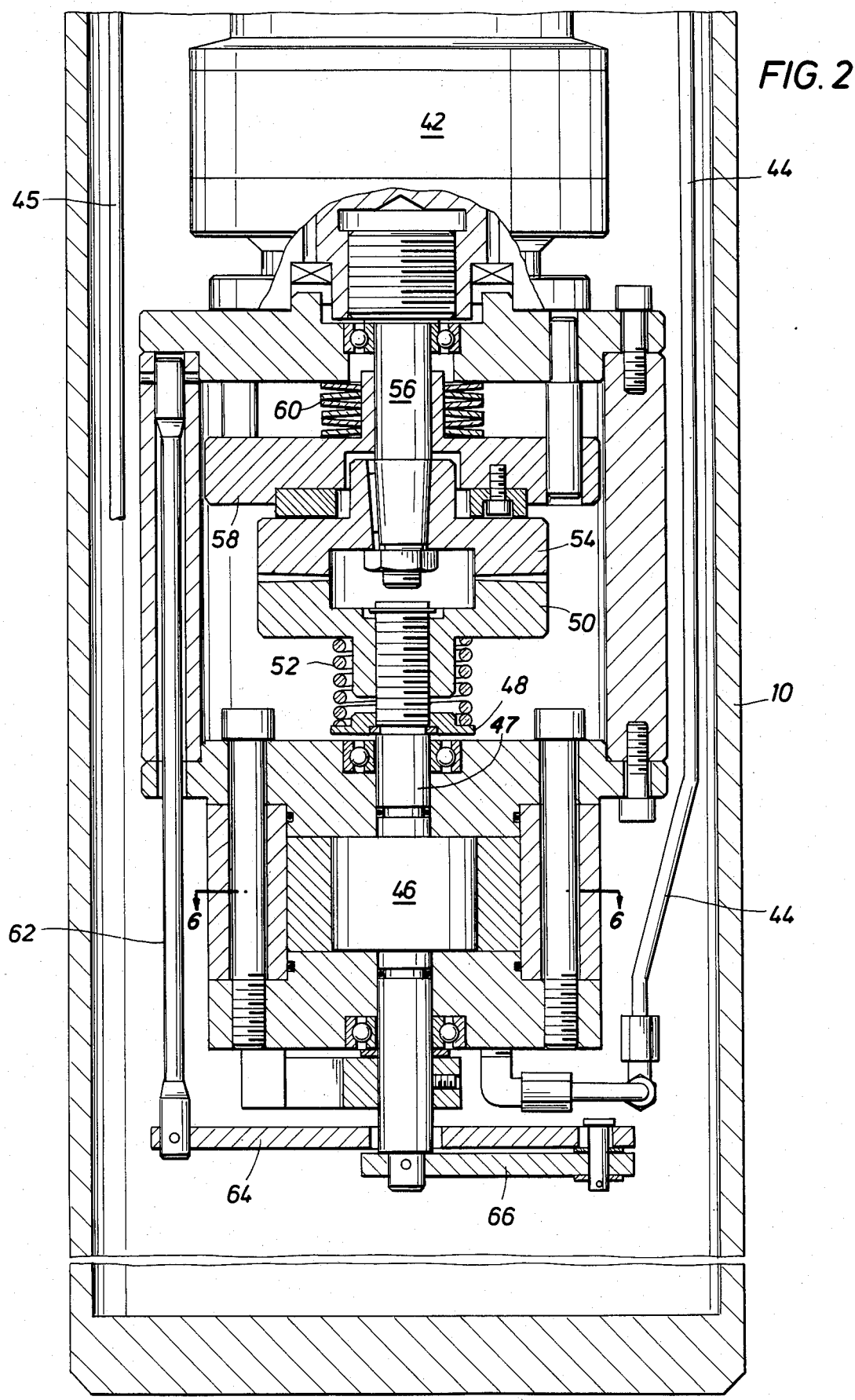
FIG. 2 is a cross-sectional view of the power portion of the preferred embodiment of the present system.
Figure 5:
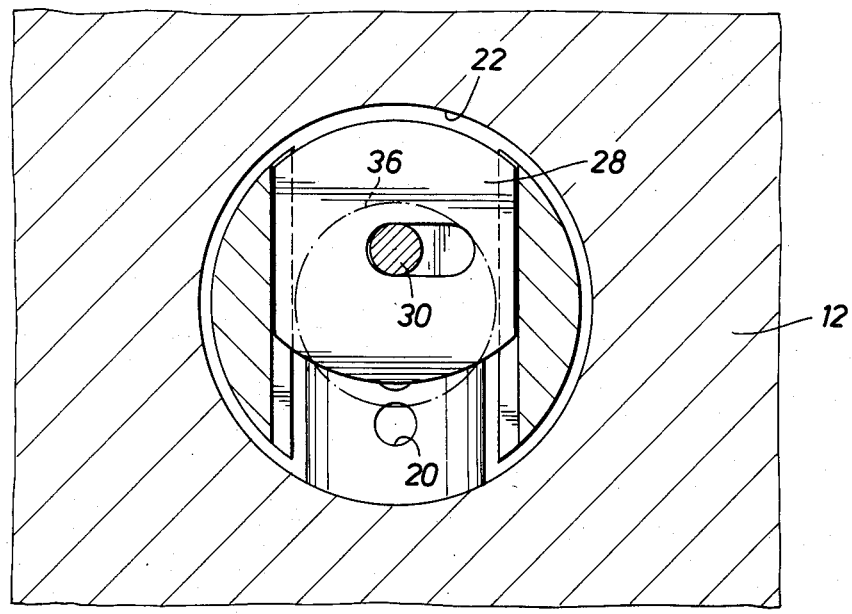
FIG. 5 is a bottom view of the carrier plate taken at 5—5 of FIG. 3.

Valve drive shaft 32 is powered by way of a gear reduction box 42, which is also shown in FIG. 2.

Now turning to the power portion of the system, a single hydraulic line 44 is connected via suitable external valving control mechanisms to chamber 46 of a vane actuator. In a subsea installation, such control mechanisms will normally be located at the surface location. The vane actuator has a shaft 47 which is connected to a clutch plate 50 which, in turn, is spline keyed thereto to provide some movement in the axial direction. A biasing spring 52 is provided between clutch plate 50 and spring plate 48 attached to shaft 47 to prevent backlash during the actuation cycle to be described.

The face of clutch plate 50 is serrated or includes sawteeth for mating with a similar sawtooth or ratchet face of clutch plate 54 aligned thereopposite.

Clutch plate 54 is connected via a key to power shaft 56, which drives the input side of the gear reduction box 42. A brake mechanism comprising plate 58 is biased by springs 60 so that when the actuation drive that is provided by plate 50 is released, power shaft 56 remains stationary through the friction provided by brake 58.

The hydraulic vane actuator is reset via torsion bar 62, which is an elongated bar operating through a mechanical linkage comprising a lever arm 64 operating through an end pinned to a fulcrum 66. The end of the fulcrum is connected to the end of the actuator shaft 47. Prior to operation, the torsion bar is preloaded to maintain the vane actuator in its open position ready to accept an actuation hydraulic pulse via hydraulic line 44.

In operation of the actuation cycle, hydraulic fluid is provided via line 44 to cause the vane actuator to rotate through a full sixteenth cycle, which increases the amount of energy stored in the torsion bar. Rotation of the actuator causes clutch plate 50 to drive clutch plate 54 and hence power shaft 56 through a comparable full sixteenth turn. Through the gear reduction mechanism, a sixteenth turn of shaft 56 translates into a 1° of rotation of shaft 32. Hence, there is a small movement of carrier plate 28 and, hence sleeve 24. A greater or lesser turn will cause rotation of the shaft in the same manner depending on the ratio of the gears in the gear reduction box.

It is preferable that with each 1° rotation of shaft 32 there is a linear change of flow rate. This may be accomplished by the coordinated sizing and position of side flow ports 20. It may be recognized that the movement of carrier plate 28 is not linear with a linear rotation of shaft 32 in that it moves the greatest when the carrier is at its mid-stroke. But, the linear rotation of the shaft to cause a linear change of flow path opening can be accomplished by the sizing and positioning of the holes in the cylinder of the choke valve.

Figure 6:
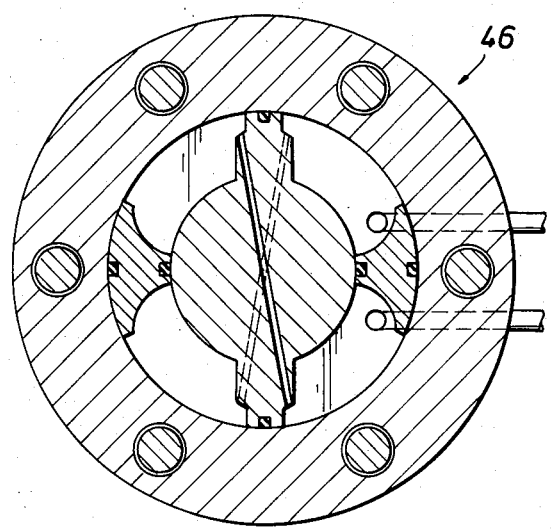
FIG. 6 is a cross-sectional view of the vane motor taken at 6—6 of FIG. 2.

Referring to FIG. 6, chamber 46 includes at least one rotor vane acting within it between an inlet port connected to incoming hydraulic line 44 and an outlet line 45 connected to an exhaust port through the stator of the actuator. The edge of the rotor vane is capped by an appropriate metal seal, but the fit is not tight so as to permit flow-by of fluid as the vane is actuated. Hence, when hydraulic actuation pressure is applied, the vane rotates and the liquid in the downstream portion of the chamber is flushed through the exhaust port, the liquid flowing by the vane rinsing any accumulated debris from the chamber at the same time. The exhaust port is connected to line 45, which is connected to chamber 46, although that connection is not completely illustrated in FIG. 2. It is similar to the connection of line 44. Finally, the vane closes against the exhaust port at the end of the actuation stroke. A suitable seal and seal plate are provided to accomplish a pressure tight seal closing of the exhaust port, the seal member on the rotor vane being mounted with respect to an 0-ring to provide self-alignment.

When the actuator has moved through its full sixteenth (22.5°) turn, the brake mechanism including plate 58 holds power shaft 56 and the brake mechanism including spring guide 36 and plate 38 holds valve drive shaft 32 in their respective locations to which they have been moved. The closing of the exhaust port in the manner described above causes back pressure to be created in the chamber. Such back pressure causes stabilization of the applied line pressure, which is sensed and used either by an operator or automatically to release the applied pressure and to permit reset to occur. The vane mechanism is then operated through a reset rotation by operation of torsion bar 62 in the absence of hydraulic input pressure, the loose fitting vane permitting reset to occur even though there is fluid remaining in chamber 46.

At the same time that the main actuator is being reset, clutch plate 50 is being carried back through reset by its connection to vane actuator shaft 47. As the serrated ratchet teeth of plate 50 are backed off with respect to the teeth of plate 54, spring 52 is compressed, which is provided through a spline connection of plate 50 with respect to shaft 47. After the full reset cycle rotation, then the plates come together again with the teeth in suitable position for the next actuation rotation upon the receipt of the next hydraulic actuation impulse.

It should be noted that movement of the vane actuator is not dependent upon a precise amount of fluid pressure in hydraulic control line 44. The precision that is provided is a result of the actuator moving a full sixteenth turn once it is actuated and being reset by the torsion bar after the actuation cycle is concluded. Hence, control is not only provided by one line but the amount of the control pressure does not have to be precise.

It may be further obvious that although the linear relationship of the opening with respect to rotation of shaft 32 is desirable, it is not essential. For example, if it is assumed that it is not linear the resulting flow rate can still be monitored and coordinated with applied pulses for obtaining the desired flow rate setting. That is, an operator would merely provide hydraulic pulses until the desired flow rate was achieved. This does not necessarily mean that there has to be a linear relationship between the rotation of shaft 32 and the opening or closing provided by sleeve 24. Further, the opening can be increased or reduced by shaft 32 rotating in one direction only. If the flow rate is to be reduced and the movement of the sleeve is toward increasing it with the next incremental rotation of shaft 32, several pulses can be provided so that sleeve 24 merely moves through its full movement to the left (full open position) and is moved back to the right to reduce flow rate, as desired.

While a single embodiment has been shown and described, it will be understood that the invention is not limited thereto, since many modifications may be made and will become apparent to those skilled in the art. For example, the description has been with respect to hydraulic fluid. The dynamic fluid could be pneumatic.

What is claimed is:

1. Apparatus for determining fluid flow rate, comprising
   a choke valve, including
      a cylinder with an axial exit opening and a plurality of entrance side flow ports,
      a sleeve moving concentrically over said cylinder to determine the amount of entrance opening provided by said side flow ports, said sleeve including side keying means,
      a back-and-forth carrier operating with said sleeve side keying means for causing said sleeve to progress from opening to closing and back to opening of said side flow ports with the travel of said carrier, said carrier including eccentric drive keying means,
      said carrier including a recess for accommodating said sleeve side keying means,
      said sleeve side keying means being a projection for riding in said recess in said carrier,
   a rotatable drive shaft at right angles to said cylinder and sleeve including compatible means for operating with said carrier drive keying means, and
   power means connected for rotating said rotatable valve drive shaft including a dynamic fluid actuator connected to receive actuation pulses from a single fluid input line,
wherein a pulse input causes an incremental change in fluid flow through said choke valve.

2. Apparatus in accordance with claim 1, wherein said carrier eccentric drive keying means is an elongate guide slot and said compatible means of said rotatable valve drive shaft is a non-axial projection for operating within said elongate guide slot.

3. Apparatus in accordance with claim 1, wherein said power means includes
   disc drive means having a first plate connected to said fluid actuator and a second plate ratchet connected to said first plate,
wherein a predetermined actuation rotation is provided through the rotation together of said first plate and said second plate to said rotatable valve drive shaft during each fluid actuation pulse and wherein said plates are not operated together with the reset rotation of said first plate.

4. Apparatus in accordance with claim 3, wherein said first plate is spring-loaded to prevent backlash during actuation rotation.

5. Apparatus in accordance with claim 3, and including a brake to hold said second plate in position during reset rotation of said first plate.

6. Apparatus for determining fluid flow rate, comprising
   a choke valve, including
      a cylinder with an axial exit opening and a plurality of entrance side flow ports,
      a sleeve moving concentrically over said cylinder to determine the amount of entrance opening provided by said side flow ports, said sleeve including side keying means,
      a back-and-forth carrier operating with said sleeve side keying means for causing said sleeve to progress from opening to closing and back to opening of said side flow ports with the travel of said carrier, said carrier including eccentric drive keying means,
   a rotatable drive shaft at right angles to said cylinder and sleeve including compatible means for operating with said carrier drive keying means, and
   power means connected for rotating said rotatable valve drive shaft including
      a dynamic fluid actuator connected to receive actuation pulses from a single fluid input line, said fluid actuator including a vane actuator which rotates through a predetermined arc with a fluid actuation pulse input, and
      torsion bar reset means connected to said fluid actuator for reset rotation of said actuator,
wherein a pulse input causes an incremental change in fluid flow through said choke valve.

* * * * *